W. R. OLMSTEAD & W. E. ORR.
SAND CLIMBING ATTACHMENT FOR AUTOMOBILES.
APPLICATION FILED MAY 23, 1913.
1,117,139.
Patented Nov. 10, 1914.
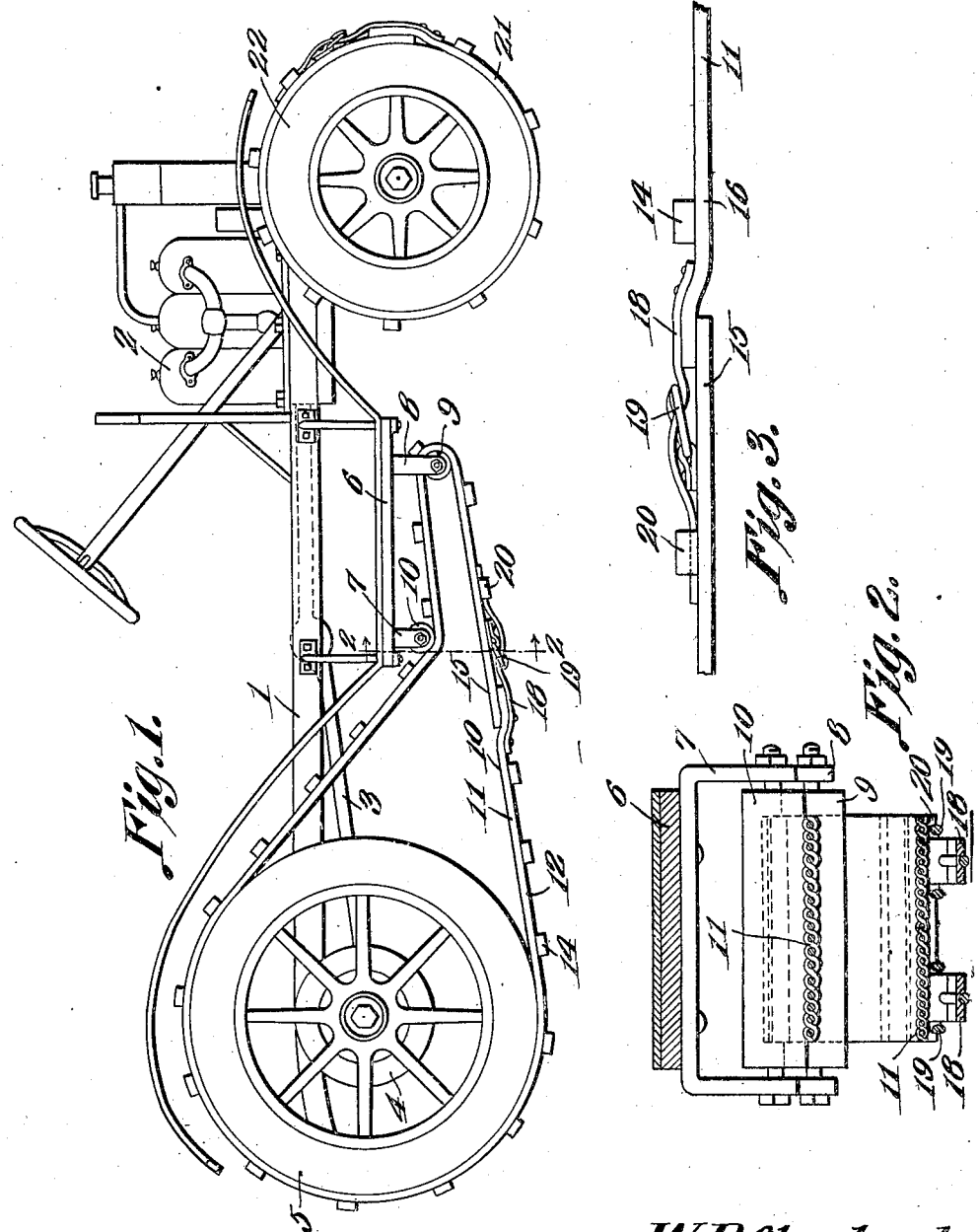
W. R. Olmstead,
W. E. Orr,
Inventors
by C. A. Snow & Co.
Attorneys
Witnesses

UNITED STATES PATENT OFFICE.

WALTER R. OLMSTEAD AND WILLIAM E. ORR, OF BEAVER, OKLAHOMA.

SAND-CLIMBING ATTACHMENT FOR AUTOMOBILES.

1,117,139.  Specification of Letters Patent.  Patented Nov. 10, 1914.

Application filed May 23, 1913. Serial No. 769,538.

*To all whom it may concern:*

Be it known that we, WALTER R. OLMSTEAD and WILLIAM E. ORR, citizens of the United States, residing at Beaver, in the county of Beaver, State of Oklahoma, have invented a new and useful Sand-Climbing Attachment for Automobile - Wheels, of which the following is a specification.

The device forming the subject matter of this application is adapted to be assembled with a vehicle wheel, to prevent the wheel from sinking into sand or soft earth.

The invention aims to provide a structure of the type above mentioned which will not only afford a support directly beneath the wheel but, as well, afford a support in front of the wheel.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing: Figure 1 shows the invention in side elevation, applied to a motor propelled vehicle; Fig. 2 is a transverse section on the line 2—2 of Fig. 1; Fig. 3 is a fragmental side elevation showing the connected ends of the traction belt.

In the accompanying drawings, the numeral 1 indicates the frame of a motor propelled vehicle, the numeral 2 indicating the engine.

The drive shaft is indicated by the numeral 3 and is operatively connected with the differential 4 to impart rotary movement to the rear wheels 5. It will be understood, however, that the device forming the subject matter of this application may be assembled with a motor propelled vehicle of any sort.

The footboard of the vehicle is denoted by the numeral 6. Attached to the footboard 6 or to some other fixed portion of the vehicle frame is a bracket 7. Secured to the footboard 6 and located in advance of the bracket 7 is another bracket 8. These brackets 7 and 8 are of arched form and are duplicates saving for the fact that the arms of the bracket 8 are slightly longer than the arms of the bracket 7. A roller 9 is supported for rotation in the bracket 8 and a roller 10 is supported for rotation in the bracket 7. A traction belt 11 is provided, the same being of any desired form. If desired, the body portion 12 of the belt 11 may be fashioned from canvas, leather or the like. Secured to the body portion 12 of the belt, transversely of the same are cleats 14, the cleats being fashioned from wood, metal, or any other substance, and being of any desired form.

The belt 11 is trained around each wheel 5 and incloses the roller 9, the roller 10 bearing upon the top of the belt. The ends of the belt are denoted by the numerals 15 and 16 and may be connected in any desired manner. In the present instance, straps 18 are applied to the end 16 of the belt, the straps being adapted to engage with buckles 19 on the end 15 of the belt. If desired, one of the cleats on the end 15, denoted specifically by the numeral 20 may be provided with openings therethrough, adapted to receive the ends of the straps 18. If desired, another belt, denoted by the numeral 21 may surround each front wheel 22. The belt 21 is of the same construction as the belt 12 and it need not be described specifically. It will be observed that not only is a portion of the periphery of each of the rear wheels 5 surrounded by the belt 11 but, as well, a portion of the lower run of the belt 11 extends in front of the wheel 5, in close relation to the ground. An increased bearing area is thus provided, and the tractive effect of the belt is increased greatly.

In practical operation, when the rear wheels 5 are driven by the engine 2, the belt 11 will be put into operation and will transverse the rollers 10 and 9. The belt 11 is wider than the wheels, in order that the wheels may not sink into the sand or other soft soil.

The invention is of peculiar utility in climbing steep and sandy hills, and after the occasion for the use of the device is passed, the belt 11 may be detached readily, and may be stored in small compass, in the vehicle.

Having thus described the invention, what is claimed is:—

In a device of the class described, a vehicle; a ground wheel carried by the vehicle; a roller supported by the vehicle; a belt trained about the roller and the wheel; spaced, soil-engaging slats on the exterior of the belt; and a second roller supported by the vehicle and located between the first specified roller and the wheel, the second roller bearing upon the upper face of the upper run of the belt, the slats being adapted to engage the second roller to effect a shaking of the upper run of the belt between the second roller and the wheel, thereby to loosen the accumulated soil on the belt, the second roller acting as a scraper as the belt passes therebeneath.

In testimony that we claim the foregoing as our own, we have hereto affixed our signatures in the presence of two witnesses.

WALTER R. OLMSTEAD.
WILLIAM E. ORR.

Witnesses:
I. W. MOORE,
H. D. MEESE.

Copies of this patent may be obtained for five cents each, by addressing the "Commissioner of Patents, Washington, D. C."